B. W. BROWN.
Cotton-Presses.

No. 150,818. Patented May 12, 1874.

Witnesses.
H. L. Perine.
Wm. R. Stansbury

Inventor.
Bartlett W. Brown
by C. M. Parks
atty.

UNITED STATES PATENT OFFICE.

BARTLETT W. BROWN, OF GALVESTON, TEXAS.

IMPROVEMENT IN COTTON-PRESSES.

Specification forming part of Letters Patent No. 150,818, dated May 12, 1874; application filed March 21, 1874.

*To all whom it may concern:*

Be it known that I, BARTLETT W. BROWN, of Galveston, Galveston county, Texas, have invented an Improvement in Cotton-Presses; and I do hereby declare the following to be a full and correct description of the same, reference being had to the accompanying drawings, in which—

Figure 1:
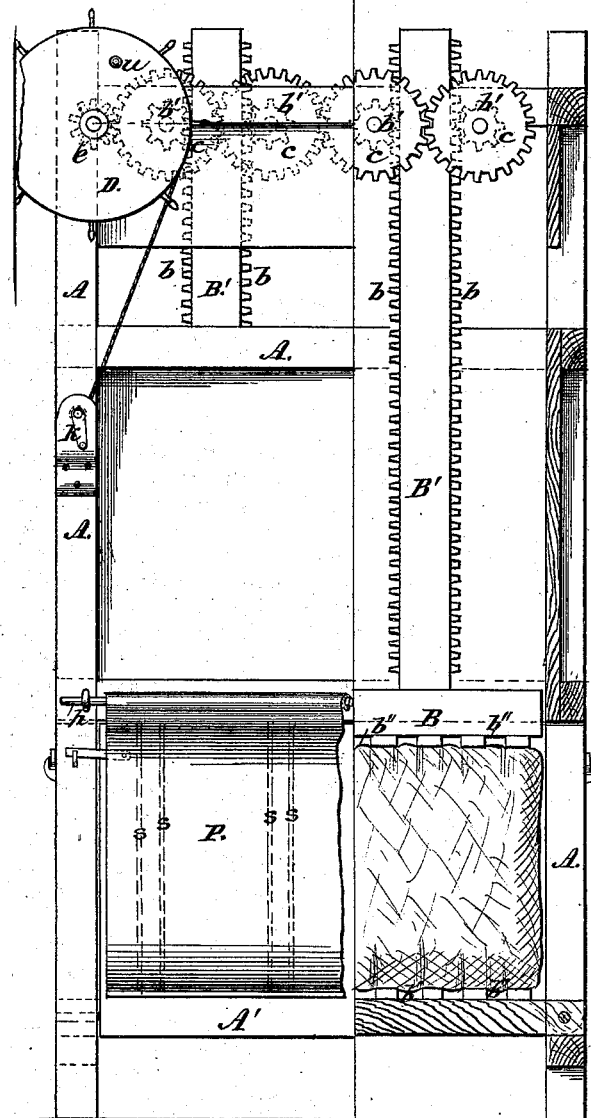
Figure 2:
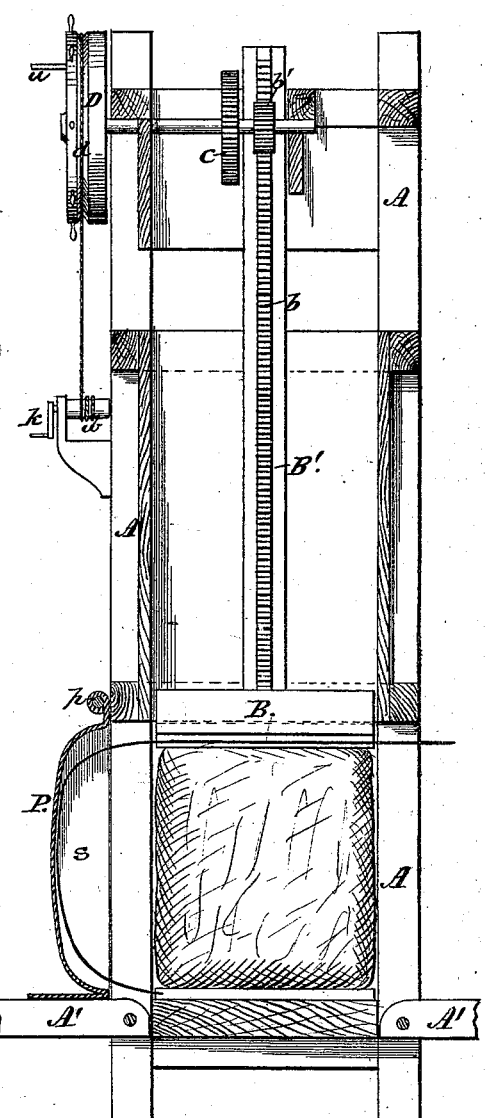

Figure 1 is a side view, partly in section; and Fig. 2 is a cross-sectional view.

My invention relates to that class of presses which are intended to bale cotton or other baleable material; and it consists in the mode of operating the plunger, which is as follows: After the plunger has run down upon the loose cotton placed in the press, (which heretofore needed a man to tread down, but which my heavy plunger in its rapid descent completely accomplishes,) the series of pinions upon suitable shafts, engaging racks upon the plunger-rods, is operated by a crank or rotary lever; and, secondly, when the above force is entirely exhausted, the application of rope and wheel and axle, to the rotary lever, by which means one man can exert the force of many; and it further consists in placing a curved plate on the opposite side of the bale to be bound, which will return the band, and save a hand in binding.

In the drawings, A represents the frame, and A' the sides, which fold up, and may be latched fast when the cotton is in process of being pressed, and may be dropped down when it is necessary to have access to the pressed cotton to bind and tie it. B is the plunger, and B' the plunger-rod, which has a rack, b, on two sides of it. Upon suitable shafts, near the top of the frame A, are pinions b', engaging the racks b. These pinions b' are operated by the gear-wheels c engaging each other, and the gear-wheels are themselves operated by a pinion, e, upon the shaft of the driving-wheel D. This driving-wheel has, first, a handle, u, upon its outside, by which the plunger B is raised to the top of the frame at the commencement of the operation of pressing; and it has, secondly, handles upon its periphery, by which the plunger is lowered in the first stages of its pressing, until this means has exhausted its force upon the cotton in the press. It has, thirdly, a groove, d, in its periphery, into which a rope is placed, firmly secured therein at one end, the other end fastened upon the axis of the windlass w, which is operated by the crank k. By this means a still greater force can be exerted upon the cotton in the press; also, upon the driving-wheel D is a space for a band from the driving-wheel of a steam-engine or other motor, by which the whole cotton-press may be operated, if desired. Upon the bottom of the plunger B are grooves b'', as also upon the floor of the bottom of the frame. Through these grooves the bands are to pass, when they are put around the bale to be bound.

It is usual to have a man on each side of the press—one to put the band through, and another to receive it and return it upon the opposite side; but I obviate the necessity of a second man by hinging to the frame A the concave plate P at p. This plate P is provided with partitions s, between two of which the band is guided, and returned to the person, who forces it forward until it reaches the same side that it entered, and there may be tied in the usual manner.

Having thus described my invention, what I claim, and desire to secure by Letters Patent, is—

1. The method of depressing the plunger of a cotton-press provided with, and by means of, the series of racks and pinions, and the successive action of a rotary lever and a rope and windlass, substantially as described.

2. A cotton or other press provided with a concave plate, P, for returning the band, substantially as described.

The above specification of my said invention signed and witnessed, at Galveston, this 16th day of March, A. D. 1874.

BARTLETT W. BROWN.

Witnesses:
R. O. DONOGHUE,
C. F. WHITE.